(12) United States Patent
Hisano et al.

(10) Patent No.: US 12,100,941 B2
(45) Date of Patent: Sep. 24, 2024

(54) ELECTRICAL WIRE PROCESSING DEVICE

(71) Applicant: Shinmaywa Industries, Ltd., Takarazuka (JP)

(72) Inventors: Masaru Hisano, Takarazuka (JP); Mitsuhiko Tsuda, Takarazuka (JP)

(73) Assignee: SHINMAYWA INDUSTRIES, LTD., Hyogo (JP)

( * ) Notice: Subject to any disclaimer, the term of this patent is extended or adjusted under 35 U.S.C. 154(b) by 776 days.

(21) Appl. No.: 17/311,710

(22) PCT Filed: Nov. 26, 2019

(86) PCT No.: PCT/JP2019/046172
§ 371 (c)(1),
(2) Date: Jun. 8, 2021

(87) PCT Pub. No.: WO2020/121803
PCT Pub. Date: Jun. 18, 2020

(65) Prior Publication Data
US 2022/0029394 A1    Jan. 27, 2022

(30) Foreign Application Priority Data

Dec. 11, 2018 (JP) .................. 2018-231920

(51) Int. Cl.
*H02G 1/12* (2006.01)
*B26D 3/08* (2006.01)

(52) U.S. Cl.
CPC ............ *H02G 1/1251* (2013.01); *B26D 3/08* (2013.01); *H02G 1/1256* (2013.01)

(58) Field of Classification Search
CPC . B26D 3/08; B26D 3/28; H02G 1/126; H02G 1/1263; H02G 1/1256; H02G 1/1251
See application file for complete search history.

(56) References Cited

U.S. PATENT DOCUMENTS 5,146,673 A * 9/1992 Hoffa ................... H02G 1/1256
29/33 M
5,522,130 A * 6/1996 Wollermann ............ B26D 5/34
29/33 F (Continued)

FOREIGN PATENT DOCUMENTS

CN   104051931 A   9/2014
JP   63-287312 A   11/1988

(Continued)

OTHER PUBLICATIONS

Official Communication issued in International Patent Application No. PCT/JP2019/046172, mailed on Feb. 10, 2020.

(Continued)

*Primary Examiner* — Sean M Michalski
(74) *Attorney, Agent, or Firm* — Keating & Bennett, LLP

(57) ABSTRACT

An electrical wire processing device (1) includes a pair of cutting blades (40A, 40B) capable of cutting an electrical wire (5) and circumferentially notching a covering (5b), a slit blade (43A, 43B) disposed farther in one side in a longitudinal direction (CL) of the electrical wire (5) than the cutting blades (40A, 40B) and capable of slitting the covering (5b) in the longitudinal direction (CL) of the electrical wire (5), and a slit blade actuator (35A, 35B) that moves the slit blade (43A, 43B) between a slit position in which the slit blade (43A, 43B) comes closer to the electrical wire (5) than the cutting blades (40A, 40B) and a retraction position in which the slit blade (43A, 43B) goes farther from the electrical wire (5) than the cutting blades (40A, 40B).

13 Claims, 14 Drawing Sheets

(56) References Cited

U.S. PATENT DOCUMENTS

| | | | | |
|---|---|---|---|---|
| 5,526,718 | A * | 6/1996 | Hoffa | H02G 1/1256 81/9.51 |
| 6,766,724 | B2 * | 7/2004 | Bernardelle | H02G 1/1256 83/947 |
| 7,103,978 | B1 * | 9/2006 | Temple | H02G 1/1217 30/90.1 |
| 7,140,215 | B2 * | 11/2006 | Viviroli | H01R 43/052 72/21.4 |
| 9,397,488 | B2 * | 7/2016 | Viviroli | H01R 43/28 |
| 11,588,308 | B2 * | 2/2023 | Wagner | H02G 1/1265 |
| 2005/0050713 | A1 * | 3/2005 | Locher | H02G 1/005 29/564.4 |
| 2013/0104720 | A1 * | 5/2013 | Parker | H01B 15/006 83/886 |
| 2022/0029394 | A1 * | 1/2022 | Hisano | B26D 3/28 |

FOREIGN PATENT DOCUMENTS

| | | |
|---|---|---|
| JP | 04-261316 A | 9/1992 |
| JP | 05-30621 A | 2/1993 |
| JP | 06-178421 A | 6/1994 |
| JP | 2008-160911 A | 7/2008 |

OTHER PUBLICATIONS

Official Communication issued in corresponding Chinese Patent Application No. 201980080528.5, mailed on Apr. 24, 2022.

* cited by examiner

ELECTRICAL WIRE PROCESSING DEVICE

BACKGROUND OF THE INVENTION

Technical Field

The present invention relates to an electrical wire processing device that can cut an electrical wire and strip a covering.

Background Art

Conventionally, electrical wire processing devices that perform a process of cutting an electrical wire and a process of stripping a covering of a middle portion of the electrical wire have been known (see, for example, Patent Document 1).

An electrical wire processing device disclosed in Patent Document 1 includes a pair of upper and lower cutting and notch cutters and a pair of upper and lower slit cutters disposed on right of the cutting and notch cutters. In the electrical wire processing device, in stripping a covering of a middle portion of an electrical wire, first, a first position in the covering of the middle portion of the electrical wire is circumferentially notched by the cutting and notch cutters. Next, the electrical wire is moved to right to be disposed between the pair of upper and lower slit cutters. Then, the covering of the middle portion of the electrical wire is slitted from the first position to a second position along a longitudinal direction of the electrical wire by the slit cutters. Thereafter, the electrical wire is moved to left to be disposed between the pair of upper and lower cutting and notch cutters again. Then, the second position in the covering of the middle portion of the electrical wire is circumferentially notched by the cutting and notch cutters. Thus, the covering of the middle portion is stripped.

CITATION LIST

Patent Document

PATENT DOCUMENT: Japanese Laid-open Patent Publication No. H5-30621

SUMMARY OF THE INVENTION

Problem to be Solved by Invention

In the electrical wire processing device described above, using the cutting and notch cutters that perform a process of cutting the electrical wire, a part of a process of stripping the covering of the middle portion of the electrical wire (that is, a process of circumferentially notching the covering) can be performed. However, in performing the process of stripping the covering of the middle portion of the electrical wire, the electrical wire needs to be moved to left and right. Therefore, there is a problem in which an effort and a time are required for performing the process of stripping the covering of the middle portion of the electrical wire.

In view of the foregoing, the present invention has been devised and it is therefore an object of the present invention to, in an electrical wire processing device that can perform a process of cutting an electrical wire and a process of stripping a covering of a middle portion of the electrical wire, enable performing these processes quickly and efficiently.

Solution to Problem

An electrical wire processing device according to the present invention is an electrical wire processing device that processes an electrical wire having a core wire and a covering that covers a periphery of the core wire and includes a pair of cutting blades capable of cutting the electrical wire and circumferentially notching the covering, a slit blade disposed farther in one side in a longitudinal direction of the electrical wire than the cutting blades and capable of slitting the covering in the longitudinal direction of the electrical wire, and a slit blade actuator that moves the slit blade between a slit position in which the slit blade comes closer to the electrical wire than the cutting blades and a retraction position in which the slit blade goes farther from the electrical wire than the cutting blades.

According to the above-described electrical wire processing device, a process of cutting the electrical wire by moving the pair of cutting blades in a direction in which the cutting blades come closer to each other (which will be hereinafter referred to as a cutting process) while the slit blade is held in the retraction position can be performed.

After moving the slit blade to the slit position and moving the slit blade toward the electrical wire to notch the covering, the covering of a middle portion of the electrical wire can be slitted along the longitudinal direction of the electrical wire by relatively moving the slit blade and the electrical wire such that the slit blade relatively moves along the longitudinal direction of the electrical wire. Both sides of a slitted portion of the covering can be circumferentially notched by moving the pair of cutting blades closer to each other while the slit blade is held in the retraction position. Thus, a process of stripping the covering of the middle portion of the electrical wire (which will be hereinafter referred to as a middle portion stripping process) can be performed.

According to the electrical wire processing device, the cutting blades and the slit blade are disposed along the longitudinal direction of the electrical wire. Therefore, in the middle portion stripping process, an operation of moving the electrical wire in a direction perpendicular to the longitudinal direction is not needed. Accordingly, the middle portion stripping process can be performed quickly and efficiently. According to the electrical wire processing device, the cutting process, and the middle portion stripping process can be performed quickly and efficiently.

According to one preferred aspect of the present invention, the electrical wire processing device further includes a clamp member that is disposed farther in the one side in the longitudinal direction of the electrical wire than the slit blade and holds the electrical wire, and a clamp actuator that relatively moves the clamp member and the slit blade along the longitudinal direction of the electrical wire.

According to the above-described aspect, the clamping member can hold the electrical wire. The clamping member and the slit blade can be moved along the longitudinal direction of the electrical wire while the clamping member holds the electrical wire. Therefore, the cutting process and the middle portion stripping process can be favorably performed.

According to one preferred aspect of the present invention, the electrical wire processing device further includes a main actuator that drives the pair of cutting blades such that the cutting blades come closer to each other and separate from each other and a controller that controls the slit blade actuator, the clamp actuator, and the main actuator. The controller includes a first position notching control section that circumferentially notches a first position in a middle portion of the covering of the electrical wire by driving the main actuator such that the cutting blades move toward the electrical wire while holding the slit blade in the retraction position, a first slit blade control section that notches the covering by driving the slit blade actuator to move the slit blade to the slit position and moving the slit blade toward the electrical wire, a second slit blade control section that relatively moves the slit blade with respect to the covering between the first position and a second position by driving the clamp actuator, and a second position notching control section that moves the slit blade to the retraction position by driving the slit blade actuator and circumferentially notches the second position of the covering by driving the main actuator such that the cutting blades move toward the electrical wire.

According to the above-described aspect, the middle portion stripping process is automatically executed by the controller.

According to one preferred aspect of the present invention, the electrical wire processing device further includes a slit blade supporting member that supports the slit blade such that the slit blade is movable between the slit position and the retraction position and is joined to a corresponding one of the cutting blades to move with the cutting blade to come closer to and separate from the electrical wire. The first slit blade control section is configured to move the slit blade toward the electrical wire to notch the covering by driving the main actuator.

According to the above-described aspect, the slit blade can be moved toward the electrical wire to notch the covering by the main actuator that drives the cutting blades. Therefore, a dedicated actuator for moving the slit blade toward the electrical wire to notch the covering is not needed. Accordingly, the number of actuators can be reduced, and a cost and a size of the electrical wire processing device can be reduced.

According to one preferred aspect of the present invention, the electrical wire processing device further includes a pair of stripping blades disposed farther in one side or the other side in the longitudinal direction of the electrical wire than the cutting blades and capable of circumferentially notching the covering.

According to the above-described aspect, the covering of the end portion of the cut electrical wire can be circumferentially notched by moving the pair of stripping blades in a direction in which the stripping blades come closer to each other while the slit blade is held in the retraction position. Then, by relatively moving the stripping blades and the electrical wire such that the stripping blades relatively move to a tip end of the electrical wire, a process of stripping the covering of the end portion of the electrical wire (which will be hereinafter referred to as an end portion stripping process) can be performed. According to the above-described aspect, the cutting process, the end portion stripping process, and the middle portion stripping process can be performed quickly and efficiently.

According to one preferred aspect of the present invention, the electrical wire processing device further includes a pair of stripping blades disposed farther in one side or the other side in the longitudinal direction of the electrical wire than the cutting blades and capable of circumferentially notching the covering. Each of the stripping blades is joined to a corresponding one of the cutting blades to move with the cutting blade to come closer to and separate from the electrical wire. The clamp actuator is configured to relatively move the clamp member and the stripping blades along the longitudinal direction of the electrical wire. The controller includes a cutting control section that cuts the electrical wire by driving the main actuator such that the cutting blades move toward the electrical wire while holding the slit blade in the retraction position, a stripping blade notching control section that circumferentially notches an end portion of the covering of the electrical wire by driving the main actuator such that the stripping blades move toward the end portion of the cut electrical wire while holding the slit blade in the retraction position, and a stripping control section that relatively moves the clamp member and the stripping blades in the longitudinal direction of the electrical wire by driving the clamp actuator in a state where the end portion of the covering of the electrical wire is being notched by the stripping blades while holding the slit blade in the retraction position.

According to the above-described aspect, the cutting process and the end portion stripping process can be automatically executed by the controller.

According to one preferred aspect of the present invention, the slit blade is disposed farther in the one side in the longitudinal direction of the electrical wire than the stripping blades.

According to the above-described aspect, the slit blade is disposed in a side opposite to a side in which the cutting blades are provided with respect to the stripping blades. A margin in space is relatively large in the side of the stripping blades opposite to the side thereof in which the cutting blades are provided, and therefore, setting of the slit blades is facilitated.

Another electrical wire processing device according to the present invention is an electrical wire processing device that processes an electric wire having a core wire and a covering that covers a periphery of the core wire and includes a pair of cutting blades capable of cutting the electrical wire and circumferentially notching the covering, a pair of first stripping blades disposed farther in one side in a longitudinal direction of the electrical wire than the cutting blades and capable of circumferentially notching the covering, a pair of second stripping blades disposed farther in the other side in the longitudinal direction of the electrical wire than the cutting blades and capable of circumferentially notching the covering, a slit blade disposed farther in the one side or the other side in the longitudinal direction of the electrical wire than the cutting blades and capable of slitting the covering in the longitudinal direction of the electrical wire, and a slit blade actuator that moves the slit blade between a slit position in which the slit blade comes closer to the electrical wire than the cutting blades, the first stripping blades, and the second stripping blades and a retraction position in which the slit blade goes farther from the electrical wire than the cutting blades, the first stripping blades, and the second stripping blades.

According to the electrical wire processing device, the cutting process can be performed by moving the pair of cutting blades in the direction in which the cutting blades come closer to each other while the slit blade is held in the retraction position.

Also, by moving the pair of first stripping blades and the pair of the second stripping blades in a direction in which the pair of first stripping blades come closer to each other and the pair of the second stripping blades come closer to each other while the slit blade is held in the retraction position, the coverings of the end portions of the cut electrical wire in one side and the other side can be circumferentially notched. Then, by relatively moving the first and second stripping blades such that each of the first and second stripping blades relatively moves to a corresponding tip end of the covering, the end stripping process for both the end portions of the electrical wire can be performed.

Furthermore, by, after moving the slit blade to the slit position and moving the slit blade in a direction in which the slit blade comes closer to the electrical wire to notch the covering, relatively moving the stripping blades and the electrical wire such that the slit blade relatively moves along the longitudinal direction of the electrical wire, the covering of the middle portion of the electrical wire can be slitted along the longitudinal direction of the electrical wire. Also, by moving the pair of cutting blades in the direction in which the cutting blades come closer to each other while the slit blade is held in the retraction position, both sides of the slitted portion of the covering can be circumferentially notched. Thus, the middle portion stripping process can be performed.

According to the electrical wire processing device, the cutting blades, the first stripping blades, the second stripping blades, and the slit blade are disposed along the longitudinal direction of the electrical wire. Therefore, in the middle portion stripping process, an operation of moving the electrical wire in a direction perpendicular to the longitudinal direction is not needed. Accordingly, the middle portion stripping process can be performed quickly and efficiently. Also, when one of the cutting process, the end portion stripping process, and the middle portion stripping process is shifted to another one of the processes, the operation of moving the electrical wire in a direction perpendicular to the longitudinal direction is not needed. Therefore, according to the electrical wire processing device, the cutting process, the end portion stripping process, and the middle portion stripping process can be performed quickly and efficiently.

According to one preferred aspect of the present invention, the electrical wire processing device further includes a first clamp member that is disposed farther in the one side in the longitudinal direction of the electrical wire than the first stripping blades and the slit blade and holds the electrical wire, a second clamp member that is disposed farther in the other side in the longitudinal direction of the electrical wire than the second stripping blades and the slit blade and holds the electrical wire, a first clamp actuator that relatively moves the first clamp member and the slit blade along the longitudinal direction of the electrical wire, and a second clamp actuator that relatively moves the second clamp member and the slit blade along the longitudinal direction of the electrical wire.

According to the above-described aspect, the first and second clamp members can hold the electrical wire. Also, while the electrical wire is held, the first clamp member and the slit blade can be relatively moved along the longitudinal direction of the electrical wire and the second clamp member and the slit blade can be relatively moved along the longitudinal direction of the electrical wire. Therefore, the cutting process, the end portion stripping process, and the middle portion stripping process can be favorably performed.

According to one preferred aspect of the present invention, the electrical wire processing device further includes a main actuator that drives the pair of cutting blades such that the cutting blades come closer to each other and separate from each other, and a controller that controls the slit blade actuator, the first clamp actuator, the second clamp actuator, and the main actuator. The controller includes a first position notching control section that circumferentially notches a first position in a middle portion of the covering of the electrical wire by driving the main actuator such that the cutting blades move toward the electrical wire while holding the slit blade in the retraction position, a first slit blade control section that notches the covering by driving the slit blade actuator to move the slit blade to the slit position and moving the slit blade toward the electrical wire, a second slit blade control section that relatively moves the slit blade with respect to the covering between the first position and a second position by driving the first clamp actuator or the second clamp actuator, and a second position notching control section that moves the slit blade to the retraction position by driving the slit blade actuator and circumferentially notches the second position of the covering by driving the main actuator such that the cutting blades move toward the electrical wire.

According to the above-described aspect, the middle portion stripping process can be automatically executed by the controller.

According to one preferred aspect of the present invention, the electrical wire processing device further includes a slit blade supporting member that supports the slit blade such that the slit blade is movable between the slit position and the retraction position and is joined to a corresponding one of the cutting blades to move with the cutting blade to come closer to and separate from the electrical wire. The first slit blade control section is configured to move the slit blade toward the electrical wire to notch the covering by driving the main actuator.

According to the above-described aspect, the slit blade can be moved toward the electrical wire by the main actuator that drives the cutting blades to notch the covering. Therefore, a dedicated actuator for moving the slit blade toward the electrical wire to notch the covering is not needed. Accordingly, the number of actuators can be reduced and a cost and a size of the electrical wire processing device can be reduced.

According to one preferred aspect of the present invention, each of the first stripping blades and each of the second stripping blades are joined to a corresponding one of the cutting blades to move with the cutting blade to come closer to and separate from the electrical wire. The first clamp actuator is configured to relatively move the first clamp member and the first stripping blades along the longitudinal direction of the electrical wire. The second clamp actuator is configured to relatively move the second clamp member and the second stripping blades along the longitudinal direction of the electrical wire. The controller includes a cutting control section that cuts and divides the electrical wire into a first electrical wire in the one side in the longitudinal direction of the electrical wire and a second electrical wire in the other side in the longitudinal direction of the electrical wire by driving the main actuator such that the cutting blades move toward the electrical wire while holding the slit blade in the retraction position, a stripping blade notching control section that circumferentially notches end portions of the coverings of the first electrical wire and the second electrical wire by driving the main actuator such that the first stripping blades move toward the end portion of the divided first electrical wire and the second stripping blades move toward the end portion of the divided second electrical wire while holding the slit blade in the retraction position, and a stripping control section that relatively moves the first clamp member and the first stripping blades in the longitudinal direction of the first electrical wire and relatively moves the second clamp member and the second stripping blades in the longitudinal direction of the second electrical wire by driving the first clamp actuator and the second clamp actuator in a state where the end portion of the covering of the first electrical wire is being notched by the first stripping blades and the end portion of the covering of the second electrical wire is being notched by the second stripping blades while holding the slit blade in the retraction position.

According to the above-described aspect, the cutting process and the end portion stripping process for the end portions of both the electrical wires are automatically executed by the controller.

According to one preferred aspect of the present invention, the slit blade is disposed farther in the one side in the longitudinal direction of the electrical wire than the first stripping blades or is disposed farther in the other side in the longitudinal direction of the electrical wire than the second stripping blades.

According to the above-described aspect, the slit blade is disposed in a side opposite to a side in which the cutting blades are provided with respect to the first stripping blades or in a side opposite to a side in which the cutting blades are provided with respect to the second stripping blades. A margin in space is relatively large in the side of the first stripping blades opposite to the side thereof in which the cutting blades are provided and in the side of the second stripping blades opposite to the side thereof in which the cutting blades are provided, and therefore, setting of the slit blades is facilitated.

Effects of the Invention

According to the present invention, in an electrical wire processing device that can perform a process of cutting an electrical wire and a process of stripping a covering of a middle portion of the electrical wire, these processes can be performed quickly and efficiently.

DETAILED DESCRIPTION OF THE PREFERRED EMBODIMENTS

Figure 1:
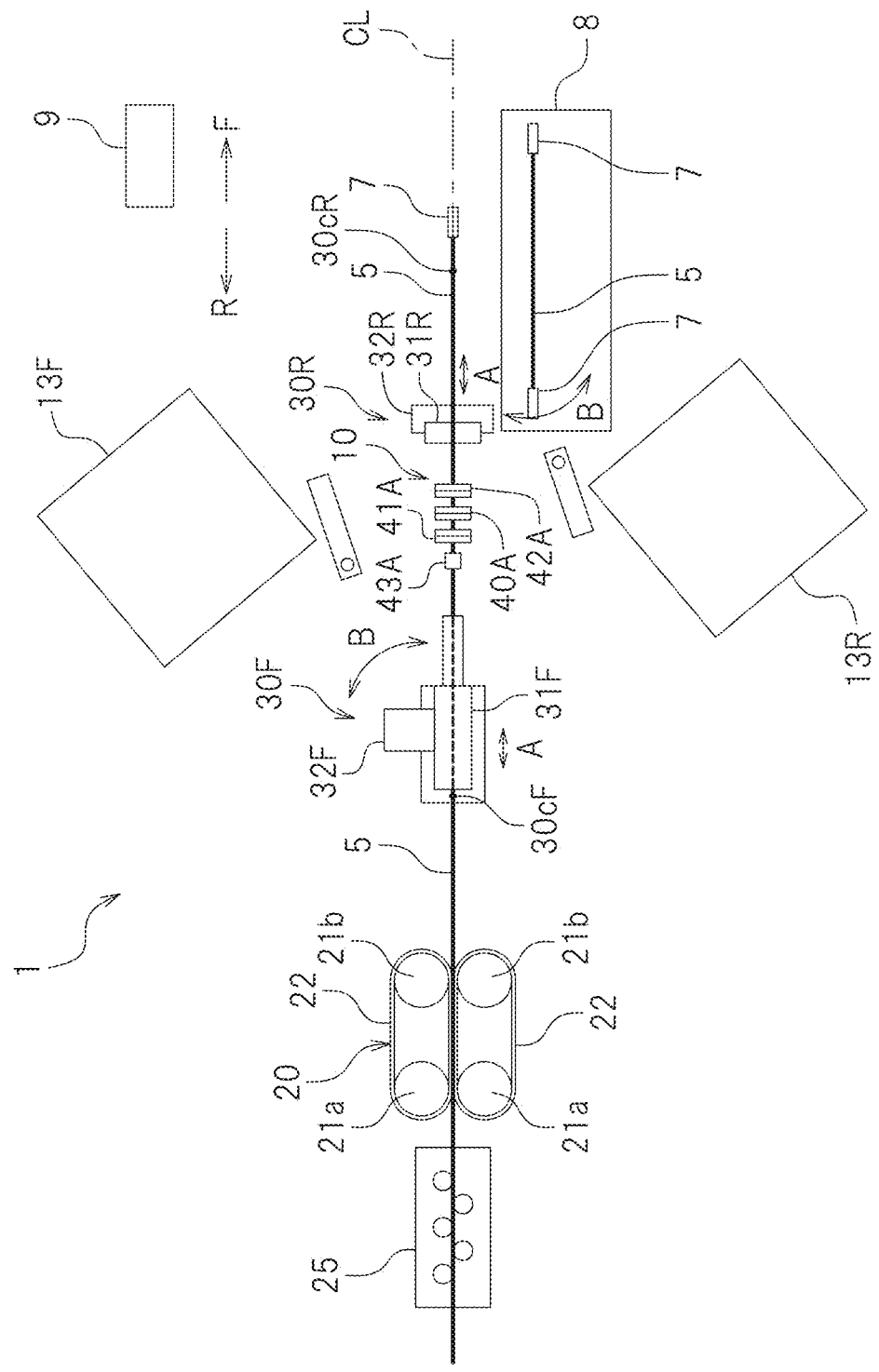
FIG. 1 is a plan view schematically illustrating a configuration of an electrical wire processing device according to an embodiment.

With reference to the attached drawings, preferred embodiments of the present invention will be described below. FIG. 1 is a plan view schematically illustrating a configuration of an electrical wire processing device 1 according to an embodiment of the present invention. In the following description, assume that a right side and a left side in FIG. 1 are a front side and a rear side, respectively. Assume that an upper side and a lower side in FIG. 1 are a left side and a right side, respectively. Reference symbols F and R in the drawings indicate front and rear, respectively. However, these directions are used in the following description merely for convenience of description and do not limit the present invention.

Figure 2:
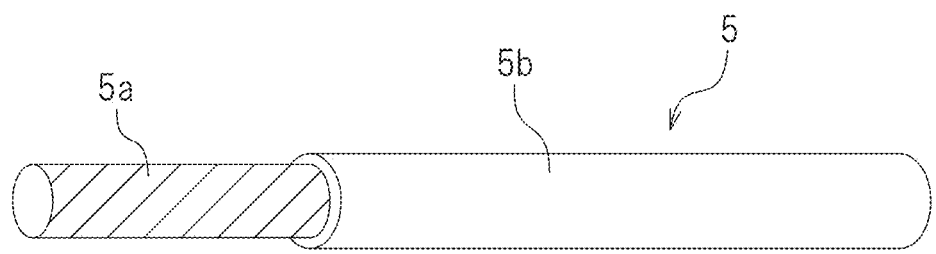
FIG. 2 is a perspective view of an electrical wire.

The electrical wire processing device 1 includes a wire drawing machine 25, a feeder 20 for feeding an electrical wire 5, electrical wire clamp devices 30F and 30R, a cutter device 10, crimping machines 13F and 13R, a controller 9, and a tray 8. As illustrated in FIG. 2, the electrical wire 5 is a so-called covered electrical wire, and includes a core wire 5a formed of a conductor and a covering 5b covering a periphery of the core wire 5a and formed of an insulator.

The wire drawing machine 25 removes a curl of the electrical wire 5 and corrects the electrical wire 5 such that the electrical wire 5 becomes straight. The wire drawing machine 25 includes a plurality of rollers disposed in a staggered manner.

The feeder 20 includes a pair of left and right driving rollers 21a, a pair of left and right driven rollers 21b, and a pair of left and right conveyance belts 22 each of which is wound around a corresponding one of the driving rollers 21a and a corresponding one of the driven rollers 21b. By causing the conveyance belts 22 to run by the driving rollers 21a, the electrical wire 5 sandwiched between the left and right conveyance belts 22 is sent forward. However, the feeder 20 may be a device that can send the electrical wire 5 and there is no limitation on a specific configuration thereof.

Each of the electrical wire clamp devices 30F and 30R can hold the electrical wire 5, move along a longitudinal direction CL of the electrical wire 5 (see an arrow A), and turn around a corresponding one of vertical lines 30cF and 30cR (see an arrow B). The electrical wire clamp device 30F includes a first clamp member 31F that holds the electrical wire 5, a first clamp actuator 32F that moves the first clamp member 31F in the longitudinal direction CL of the electrical wire 5 (a front-rear direction in this embodiment), and a first turning actuator 36F (see FIG. 4) that turns the first clamp member 31F around the vertical line 30cF. The electrical wire clamp device 30R includes a second clamp member 31R that holds the electrical wire 5, a second clamp actuator 32R that moves the second clamp member 31R in the longitudinal direction CL of the electrical wire 5, and a second turning actuator 36R (see FIG. 4) that turns the second clamp member 31R around the vertical line 30cR.

The cutter device 10 can cut the electrical wire 5, strip the covering 5b of an end portion of the electrical wire 5, and strip the covering 5b of a middle portion of the electrical wire 5. A specific configuration of the cutter device 10 will be described later.

The crimping machines 13F and 13R crimp a terminal 7 to end portions of the electrical wire 5. As described above, each of the electrical wire clamp devices 30F and 30R is configured to turn around a corresponding one of the vertical lines 30cF and 30cR. The crimping machine 13F is configured to crimp the terminal 7 to a front end portion of the electrical wire 5 held by the electrical wire clamp device 30F. The crimping machine 13R is configured to crimp the terminal 7 to a rear end portion of the electrical wire 5 held by the electrical wire clamp device 30R.

The tray 8 is a box body in which the electrical wire 5 after processing is collected. The tray 8 houses the electrical wire 5 to which the terminal 7 is crimped in both sides, the electrical wire 5 from which the covering 5b of the middle portion has been stripped, or the like.

Figure 3:
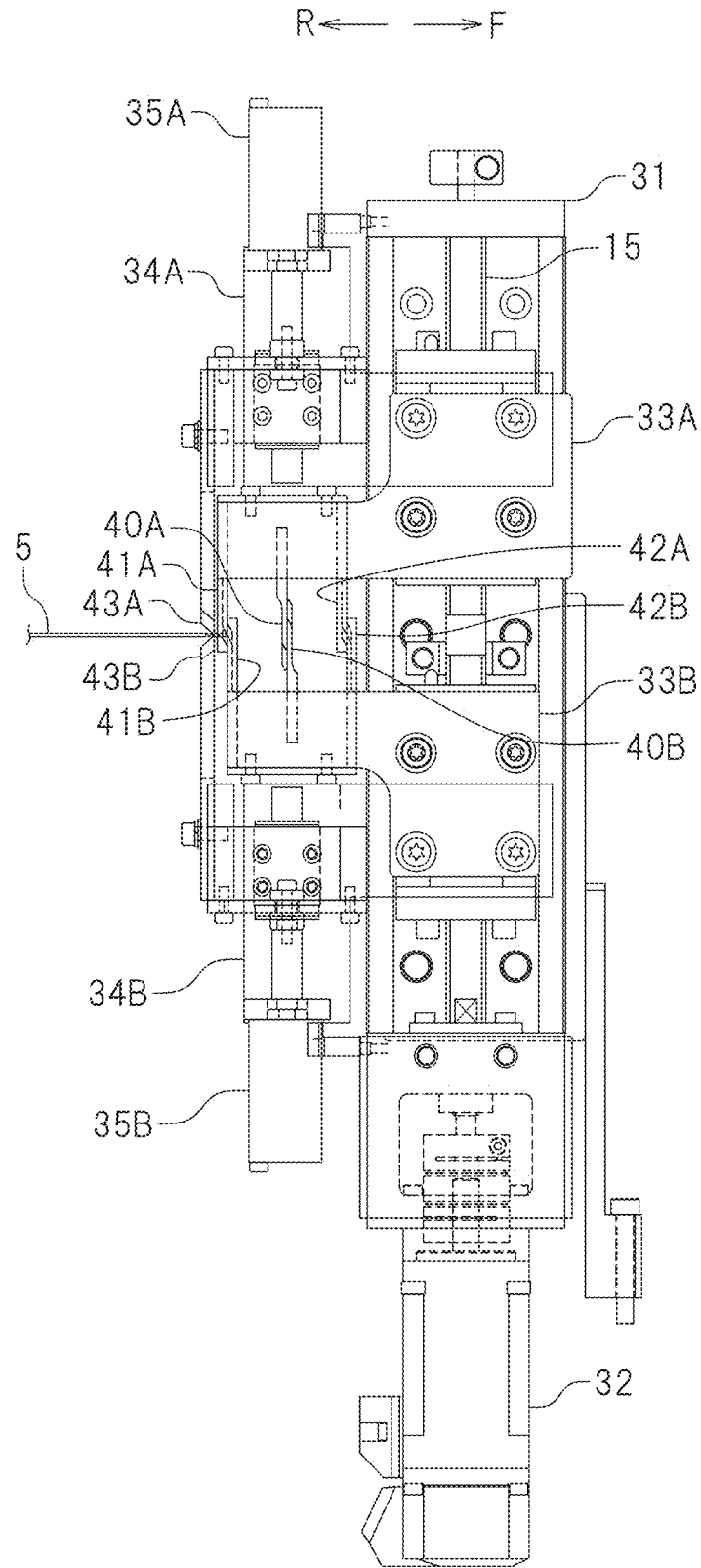
FIG. 3 is a right side view of a cutter device.

Next, a detailed configuration of the cutter device 10 will be described. FIG. 3 is a right side view of the cutter device 10. The cutter device 10 incudes a pair of upper and lower cutting blades 40A and 40B, a pair of upper and lower first stripping blades 41A and 41B disposed rearward of the cutting blades 40A and 40B, a pair of upper and lower second stripping blades 42A and 42B disposed forward of the cutting blades 40A and 40B, and a pair of upper and lower slit blades 43A and 43B disposed rearward of the first stripping blades 41A and 41B. The cutting blades 40A and 40B, the first stripping blades 41A and 41B, the second stripping blades 42A and 42B, and the slit blades 43A and 43B are disposed along the longitudinal direction CL of the electrical wire 5. Specifically, the upper cutting blade 40A, the upper first stripping blade 41A, the upper second stripping blade 42A, and the upper slit blade 43A are disposed in line in the front-rear direction, and the lower cutting blade 40B, the lower first stripping blade 41B, the lower second stripping blade 42B, and the lower slit blade 43B are disposed in line in the front-rear direction. The cutter device 10 includes a frame 31, a guide 15 provided in the frame 31 and extending up and down, an upper block 33A and a lower block 33B engaged with the guide 15 so as to be slidable up and down, and a main actuator 32 driving the upper block 33A and the lower block 33B up and down such that the upper block 33A and the lower block 33B come closer to each other or separate from each other.

The upper cutting blade 40A, the upper first stripping blade 41A, and the upper second stripping blade 42A are supported by the upper block 33A. Note that, in this specification, the expression "being supported" indicates both a case of being directly supported and a case of being indirectly supported via some other member, unless otherwise noted. In this embodiment, the upper cutting blade 40A, the upper first stripping blade 41A, and the upper second stripping blade 42A are indirectly supported by the upper block 33A and are configured to move up and down with the upper block 33A. The upper stripping blades 41A and 42A are indirectly joined to the upper cutting blade 40A to move up and down with the upper cutting blade 40A. The lower cutting blade 40B, the lower first stripping blade 41B, and the lower second stripping blade 42B are supported by the lower block 33B and are configured to move up and down with the lower block 33B. The lower first stripping blades 41B and the lower second stripping blade 42B are indirectly joined to the lower cutting blade 40B to move up and down with the lower cutting blade 40B.

The main actuator 32 may be an actuator that can drive the upper block 33A and the lower block 33B up and down, and there is no limitation on a type of the main actuator 32. In this embodiment, the main actuator 32 is constituted by a servo motor. The main actuator 32 is configured to cause the upper block 33A and the lower block 33B to come closer to each other and separate from each other. When the upper block 33A and the lower block 33B move to come closer to each other, the upper cutting blade 40A and the lower cutting blade 40B come closer to each other, the upper first stripping blade 41A and the lower first stripping blade 41B come closer to each other, and the upper second stripping blade 42A and the lower second stripping blade 42B come closer to each other. That is, when the upper block 33A and the lower block 33B move to come closer to each other, the cutting blades 40A and 40B, the first stripping blades 41A and 41B, and the second stripping blades 42A and 42B move toward the electrical wire 5. On the other hand, when the upper block 33A and the lower block 33B move to separate from each other, the upper cutting blade 40A and the lower cutting blade 40B separate from each other, the upper first stripping blade 41A and the lower first stripping blade 41B separate from each other, and the upper second stripping blade 42A and the lower second stripping blade 42B separate from each other. That is, when the upper block 33A and the lower block 33B move to separate from each other, the cutting blades 40A and 40B, the first stripping blades 41A and 41B, and the second stripping blades 42A and 42B move to separate from the electrical wire 5.

An upper slit blade supporting member 34A is fixed to the upper block 33A. The upper slit blade supporting member 34A is configured to move up and down with the upper block 33A. The upper slit blade 43A is supported so as to be movable up and down by the upper slit blade supporting member 34A. The upper slit blade 43A is movable up and down between a slit position in which the upper slit blade 43A is closer to the electrical wire 5 than the upper cutting blade 40A and the upper stripping blades 41A and 42A and a retraction position in which the upper slit blade 43A goes farther from the electrical wire 5 than the upper cutting blade 40A and the upper stripping blades 41A and 42A. A slit blade actuator 35A that drives the upper slit blade 43A up and down is fixed to the upper slit blade supporting member 34A.

A lower slit blade supporting member 34B is fixed to the lower block 33B. The lower slit blade supporting member 34B is configured to move up and down with the lower block 33B. The lower slit blade 43B is fixed to the lower slit blade supporting member 34B so as to be movable up and down. The lower slit blade 43B is movable up and down between a slit position in which the lower slit blade 43B comes closer to the electrical wire 5 than the lower cutting blade 40B and the lower stripping blades 41B and 42B and the retraction position in which the lower slit blade 43B goes farther from the electrical wire 5 than the lower cutting blade 40B and the lower stripping blades 41B and 42B. A slit blade actuator 35B that drives the lower slit blade 43B up and down is fixed to the lower slit blade supporting member 34B.

Each of the slit blade actuators 35A and 35B can move a corresponding one of the upper and lower slit blades 43A and 43B to the slit position and the retraction position. In this embodiment, each of the slit blade actuators 35A and 35B is constituted by an air cylinder. However, each of the slit blade actuators 35A and 35B may be an actuator capable of moving a corresponding one of the slit blades 43A and 43B to the slit position and the retraction position and is not limited to the air cylinder. Each of the slit blade actuator 35A and 35B may be constituted by, for example, a solenoid or a motor.

Figure 4:
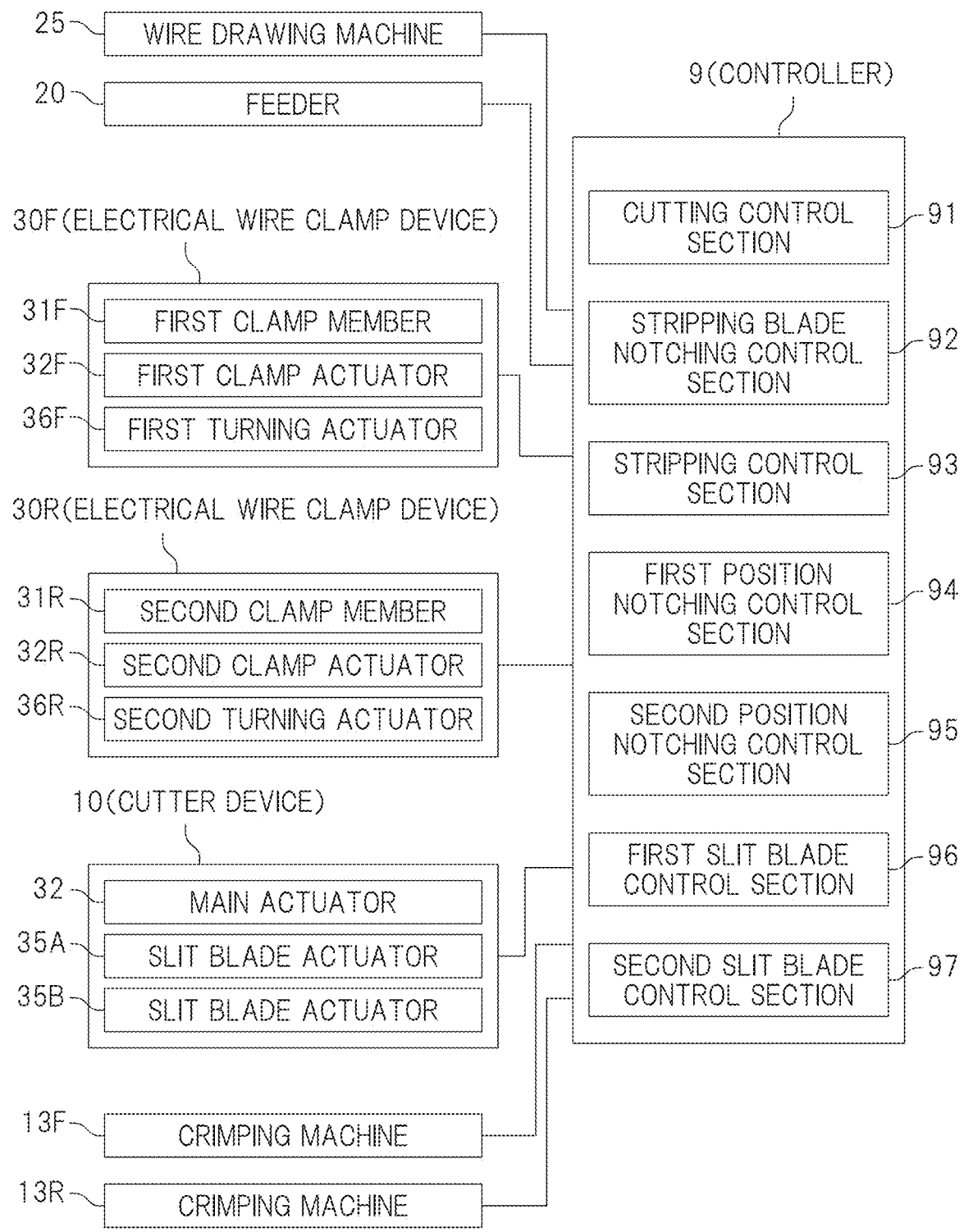
FIG. 4 is a block diagram of a control system of the electrical wire processing device.

As illustrated in FIG. 4, the controller 9 is communicably coupled to the wire drawing machine 25, the feeder 20, the electrical wire clamp devices 30F and 30R, the cutter device 10, and the crimping machines 13F and 13R and controls operations thereof. The controller 9 may be a dedicated computer for the electrical wire processing device 1 and may be a general purpose computer, such as a personal computer or the like. The controller 9 includes a cutting control section 91, a stripping blade notching control section 92, a stripping control section 93, a first position notching control section 94, a second position notching control section 95, a first slit blade control section 96, and a second slit blade control section 97. Note that a process performed by each of the sections 91 to 97 will be described later. In this embodiment, each of the above-described sections 91 to 97 is realized by executing a predetermined program by the computer.

Next, each process performed by the electrical wire processing device 1 will be described. As will be described below, the electrical wire processing device 1 can perform a process of cutting the electrical wire 5 (cutting process), a process of stripping the covering 5b of an end portion of the cut electrical wire 5 (end portion stripping process), a process of crimping the terminal 7 to the end portion of the electrical wire 5 (terminal crimping process), and a process of stripping the covering 5b of a middle portion of the electrical wire 5 (middle portion stripping process). Each process described below is executed by the controller 9.

Figure 5:
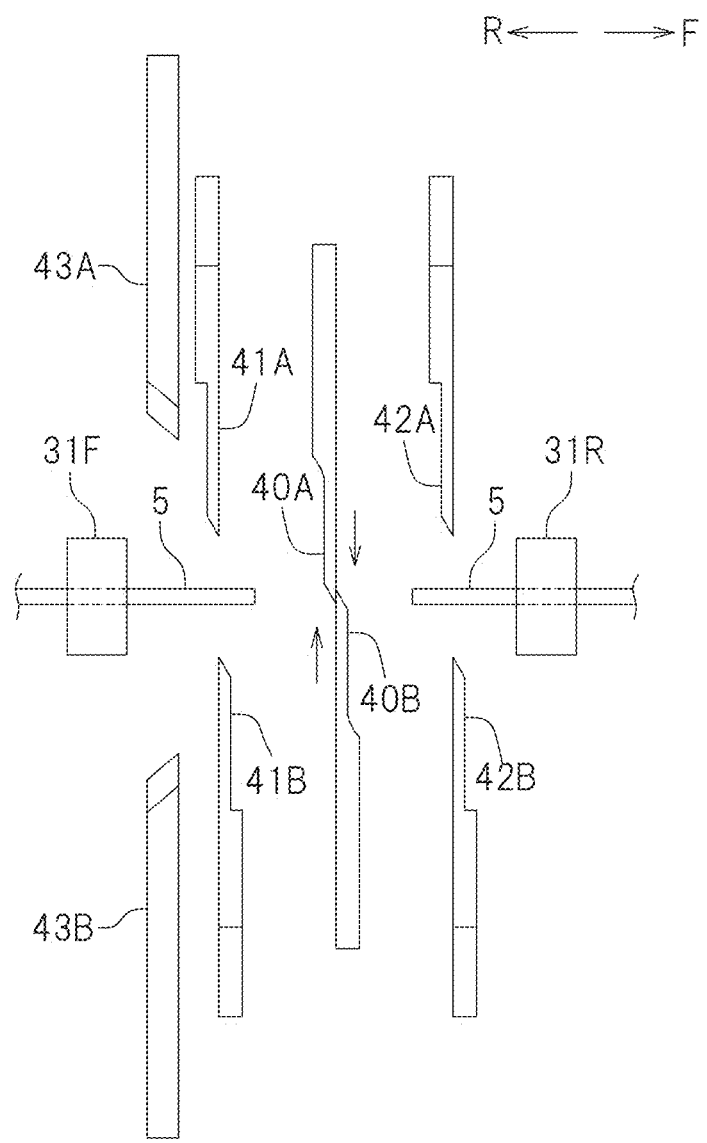
FIG. 5 is a right side view of a main portion of the cutter device when the electrical wire is cut.

First, the cutting process will be described. In the cutting process, the cutting control section 91 of the controller 9 holds the slit blades 43A and 43B in the retraction position. The cutting control section 91 drives the main actuator 32 such that the electrical wire 5 is held by the first clamp member 31F and the second clamp member 31R and the cutting blades 40A and 40B move toward the electrical wire 5. Specifically, the cutting control section 91 causes the cutting blades 40A and 40B to come closer to each other until respective edges of the cutting blades 40A and 40B cross each other. Thus, as illustrated in FIG. 5, the electrical wire 5 is cut and divided into a rear electrical wire 5 and a front electrical wire 5 by the cutting blades 40A and 40B. The cutting process is as described above.

Figure 6:
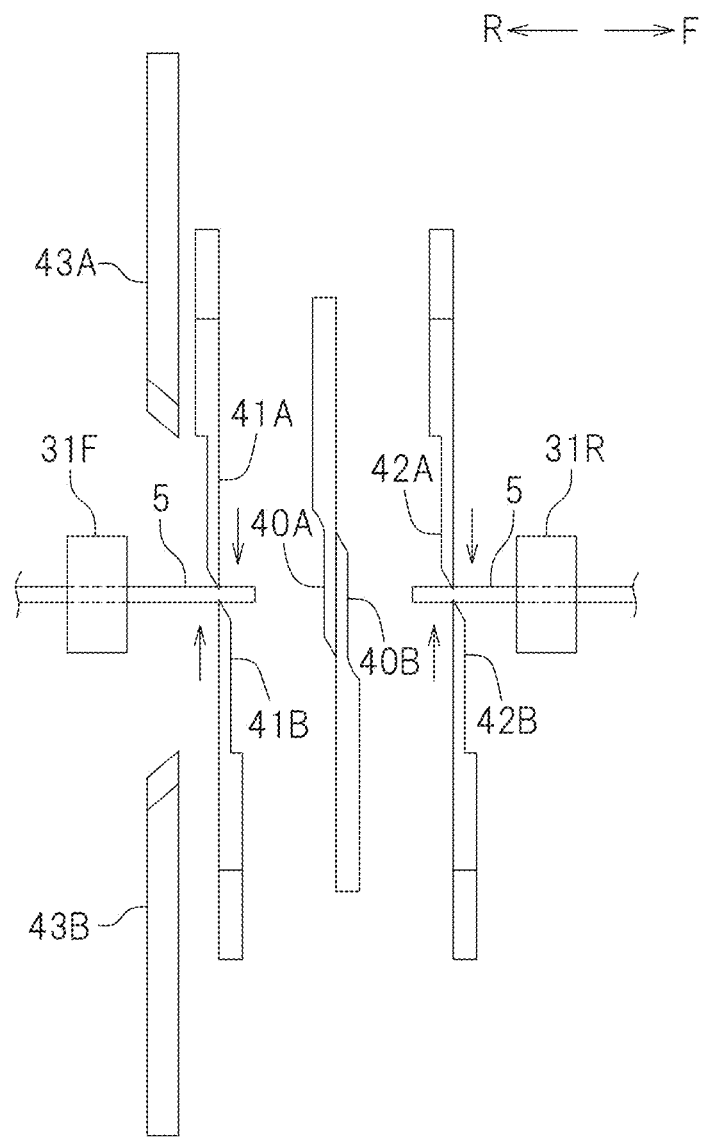
FIG. 6 is a right side view of the main portion of the cutter device when the electrical wire is notched by strip blades.
Figure 7:
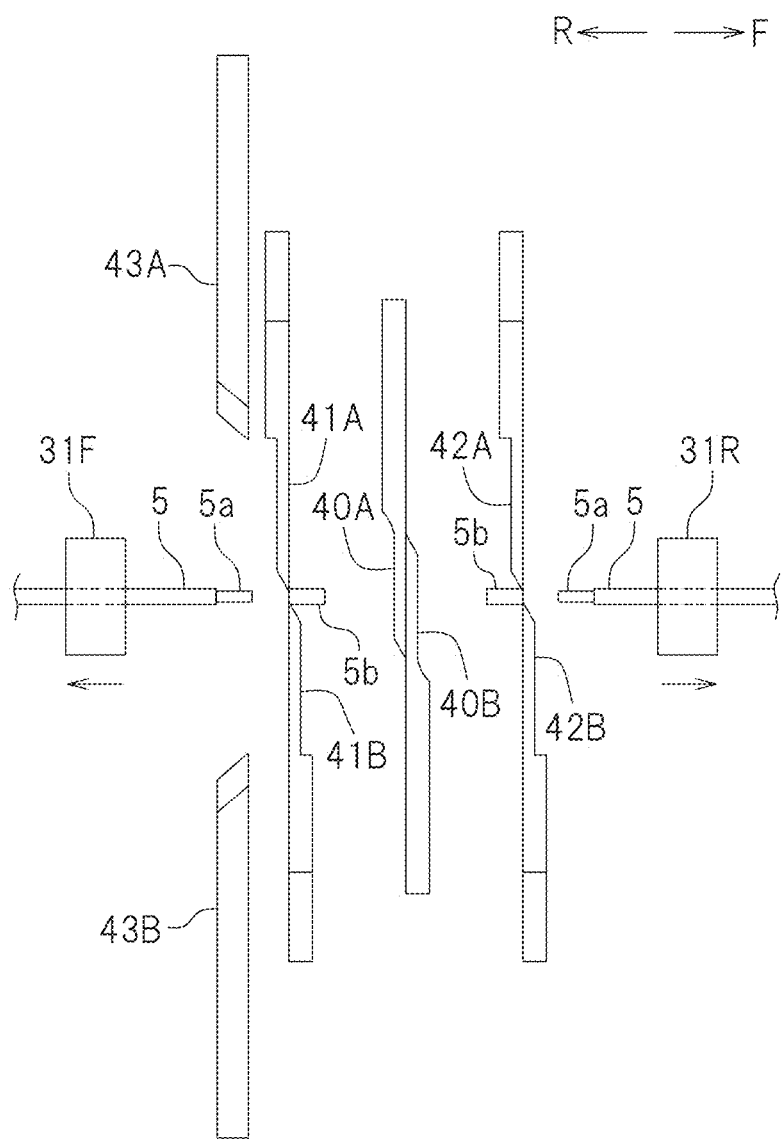
FIG. 7 is a right side view of the main portion of the cutter device when a covering of an end portion of the electrical wire is stripped.

Subsequently, as illustrated in FIG. 6, the stripping blade notching control section 92 of the controller 9 drives the main actuator 32 such that the first stripping blades 41A and 41B and the second stripping blades 42A and 42B move toward the electrical wire 5. Thus, the covering 5b of a front end portion of the rear electrical wire 5 is circumferentially notched by the first stripping blades 41A and 41B. The covering 5b of a rear end portion of the front electrical wire 5 is circumferentially notched by the second stripping blades 42A and 42B. Next, as illustrated in FIG. 7, the stripping control section 93 of the controller 9 moves the first clamp member 31F holding the rear electrical wire 5 rearward and moves the second clamp member 31R holding the front electrical wire 5 forward. Then, the rear electrical wire 5 is pulled rearward and the covering 5b of the front end portion of the rear electrical wire 5 is stripped by the first stripping blades 41A and 41B. The front electrical wire 5 is pulled forward and the covering 5b of the rear end portion of the front electrical wire 5 is stripped by the second stripping blades 42A and 42B. Thus, the covering 5b of the end portions of both the electrical wires 5 after being cut is stripped. The end portion stripping process is as described above.

When the end portion stripping process ends, the controller 9 turns the electrical wire clamp devices 30F and 30R (see FIG. 1). The electrical wire clamp device 30F turns leftward while holding the rear electrical wire 5 and guides the front end portion of the rear electrical wire 5 to the crimping machine 13F. On the other hand, the electrical wire clamp device 30R turns rightward while holding the front electrical wire 5 and guides the read end portion of the front electrical wire 5 to the crimping machine 13R. Then, the terminal 7 is crimped to the front end portion of the rear electrical wire 5 and the rear end portion of the front electrical wire 5 by the crimping machines 13F and 13R. The terminal crimping process is as described above.

Thereafter, the electrical wire clamp device 30F returns to an initial position (the position illustrated in FIG. 1) opposed to the cutter device 10 while holding the rear electrical wire 5, and releases holding of the electrical wire 5. After releasing holding of the front electrical wire 5, the electrical wire clamp device 30R returns to an initial position (the position illustrated in FIG. 1) opposed to the cutter device 10. Note that, when the holding by the electrical wire clamp device 30R is released, the front electrical wire 5 falls and is collected in the tray 8.

Figure 8:
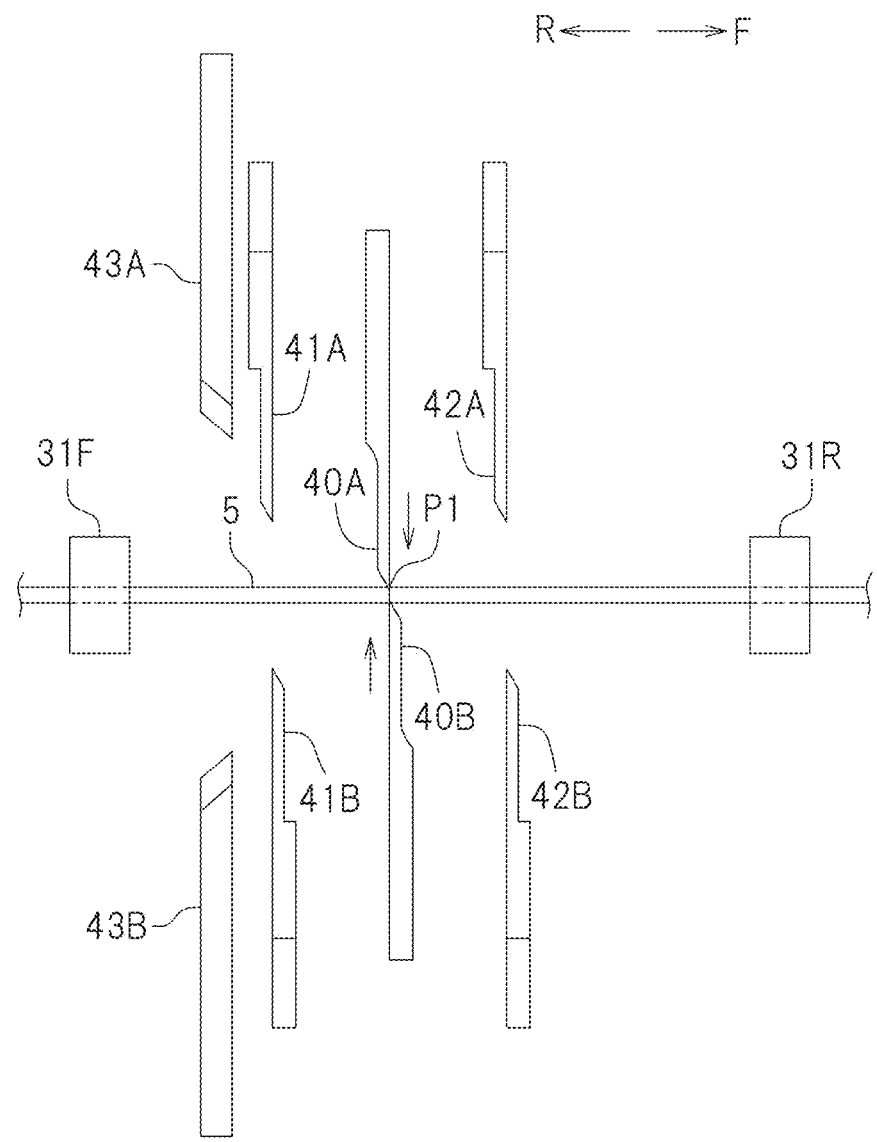
FIG. 8 is a right side view of the main portion of the cutter device when a first position in the covering is notched by cutting blades.

Next, the middle portion stripping process will be described. First, the controller 9 causes the first clamp member 31F and the second clamp member 31R to hold the electrical wire 5. Next, the first position notching control section 94 of the controller 9 drives the main actuator 32 such that the slit blades 43A and 43B are held in the retraction position and the cutting blades 40A and 40B move toward the electrical wire 5. Specifically, the first position notching control section 94 causes the cutting blades 40A and 40B to come closer to each other such that each of the cutting blades 40A and 40B comes to a position just before a position in which the respective edges of the cutting blades 40A and 40B cross each other. Then, as illustrated in FIG. 8, the covering 5b of the middle portion of the electrical wire 5 is circumferentially notched. Note that this notching position will be hereinafter referred to as a first position P1.

Figure 9:
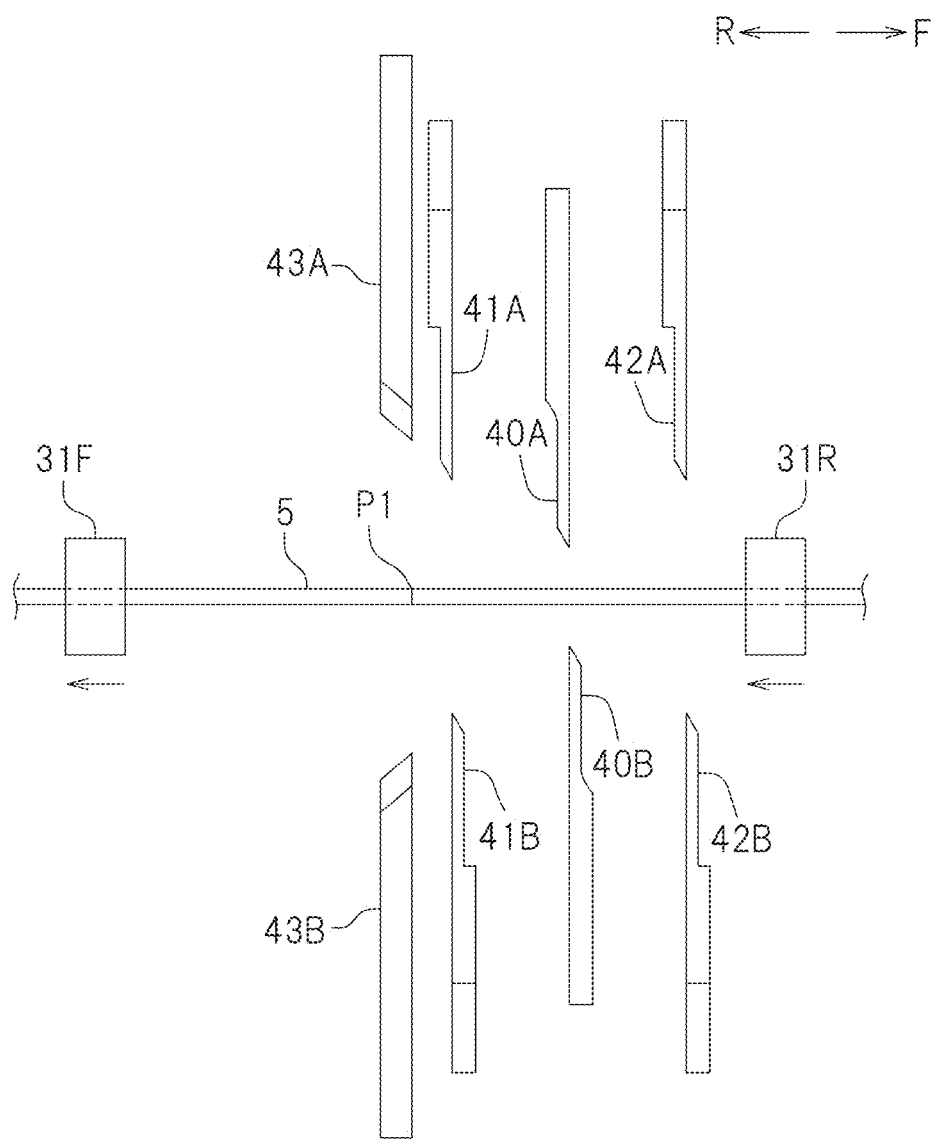
FIG. 9 is a right side view of the main portion of the cutter device when the electrical wire is moved rearward such that the first position of the covering is located between a pair of slit blades.

Next, as illustrated in FIG. 9, the controller 9 causes the cutting blades 40A and 40B to separate from each other and moves the electrical wire 5 rearward until the first position P1 of the covering 5b matches a position between the slit blades 43A and 43B. That is, the controller 9 moves the electrical wire 5 rearward until the first position P1 of the covering 5b matches a position directly below the upper slit blade 43A and a position directly above the lower slit blade 43B.

Figure 10:
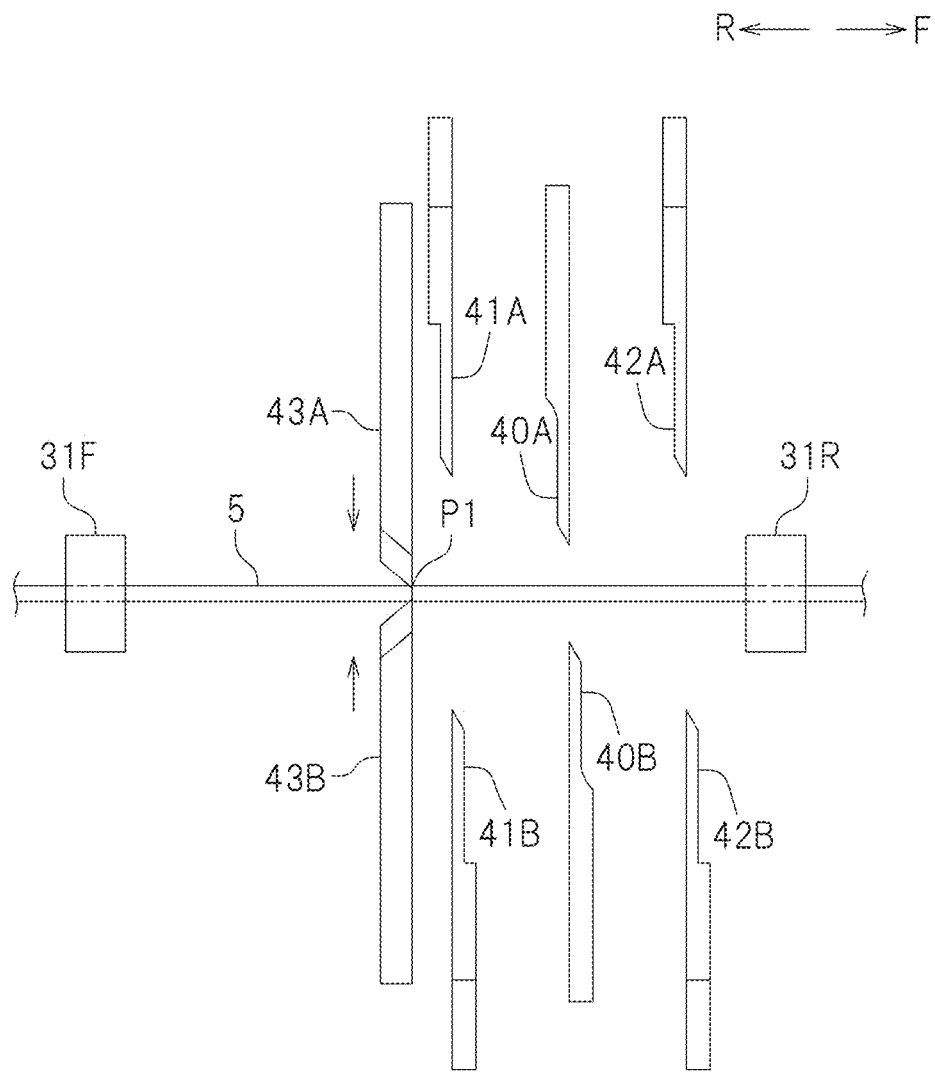
FIG. 10 is a right side view of the main portion of the cutter device when the first position in the covering is notched by the slit blades.

The first slit blade control section 96 of the controller 9 drives the slit blade actuators 35A and 35B to move the slit blades 43A and 43B from the retraction position to the slit position. Note that a timing of moving the slit blades 43A and 43B to the slit position may be before, after, and during moving the electrical wire 5 rearward. Next, the first slit blade control section 96 of the controller 9 drives the main actuator 32 such that the upper block 33A and the lower block 33B come closer to each other. Thus, the slit blades 43A and 43B move to come closer to each other. The first slit blade control section 96 moves the slit blades 43A and 43B toward the electrical wire 5 until the slit blades 43A and 43B notch the first position P1 of the covering 5b (see FIG. 10).

Figure 11:
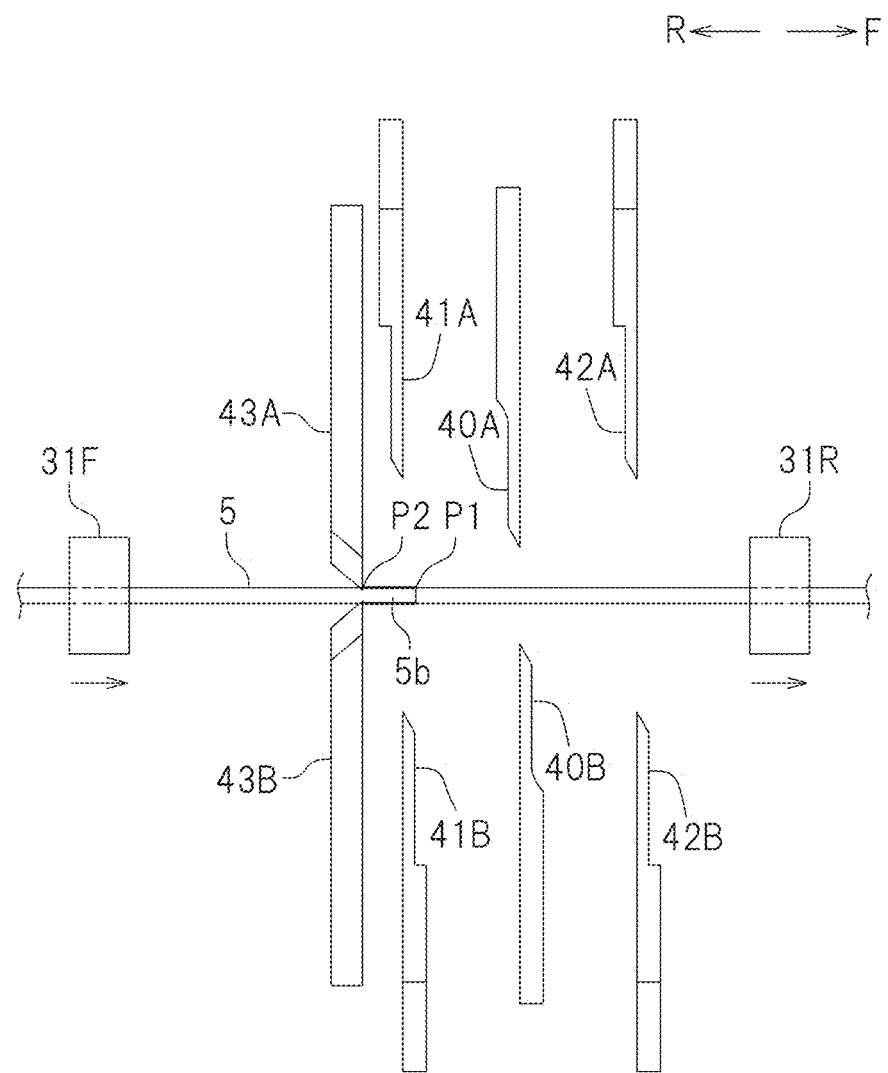
FIG. 11 is a right side view of the main portion of the cutter device when the covering is slitted from the first position to a second position by the slit blades.

Next, the second slit blade control section 97 of the controller 9 moves the electrical wire 5 forward while a state where the slit blades 43A and 43B are notching the covering 5b by driving the first clamp actuator 32F and the second clamp actuator 32R is kept. Then, as illustrated in FIG. 11, the covering 5b is slitted along the longitudinal direction CL of the electrical wire 5 by the slit blades 43A and 43B. The second slit blade control section 97 moves the electrical wire 5 forward until the slit blades 43A and 43B reach a preset second position P2 of the covering 5b. Thus, the electrical wire 5 is slitted from the first position P1 of the covering 5b to the second position P2 thereof in the longitudinal direction CL.

Figure 12:
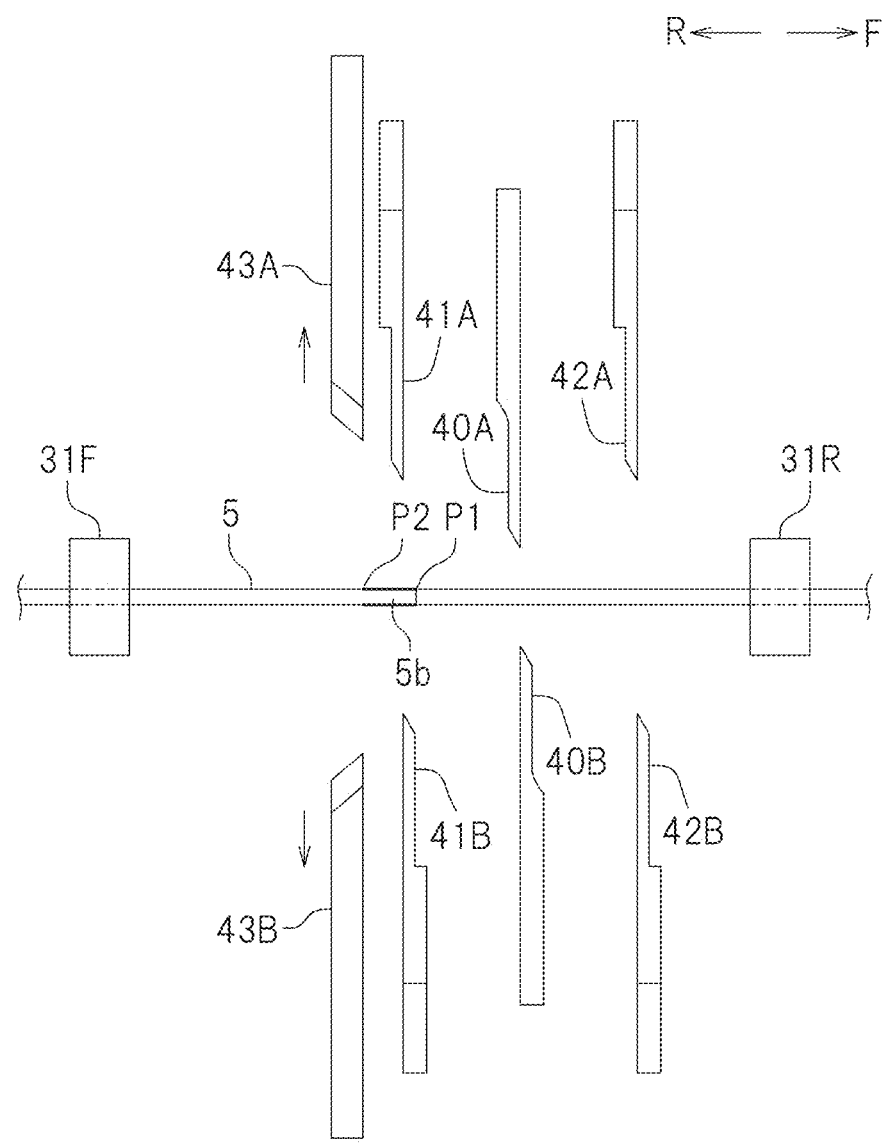
FIG. 12 is a right side view of the main portion of the cutter device when the slit blades are moved to a retraction position.

Next, as illustrated in FIG. 12, the controller 9 drives the main actuator 32 such that the upper block 33A and the lower block 33B separate from each other.

Figure 13:
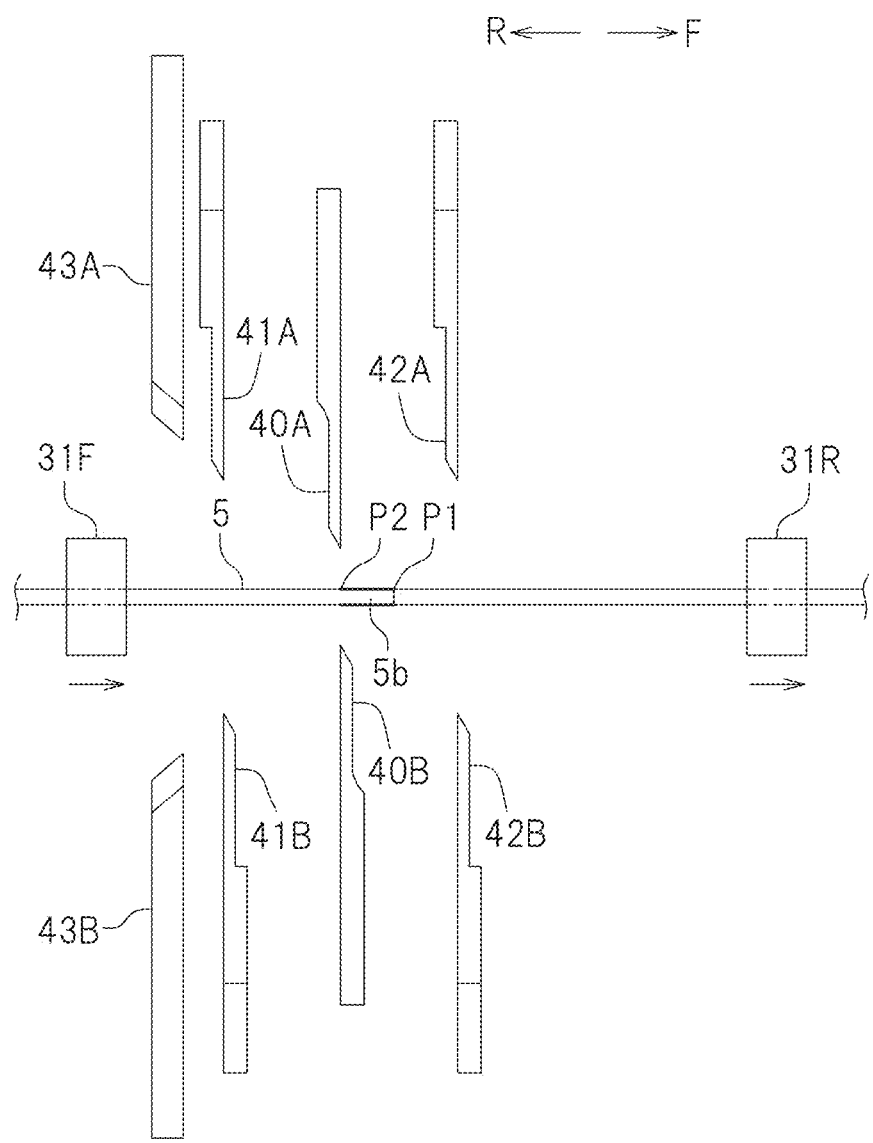
FIG. 13 is a right side view of the main portion of the cutter device when the electrical wire is moved forward such that the second position in the covering is located between the pair of cutting blades.

The second position notching control section 95 of the controller 9 drives the slit blade actuators 35A and 35B to move the slit blades 43A and 43B from the slit position to the retraction position. Note that a timing of moving the slit blades 43A and 43B to the retraction position may be before, after, and during causing the upper block 33A and the lower block 33B to separate from each other. As illustrated in FIG. 13, the second position notching control section 95 of the controller 9 moves the electrical wire 5 forward until the second position P2 of the covering 5b matches a position between the cutting blades 40A and 40B. That is, the second position notching control section 95 moves the electrical wire 5 forward until the second position P2 of the covering 5b matches a position directly below the upper cutting blade 40A and a position directly above the lower cutting blade 40B. Note that a timing of moving the electrical wire 5 forward may be before, after, and during moving the slit blades 43A and 43B to the retraction position.

Figure 14:
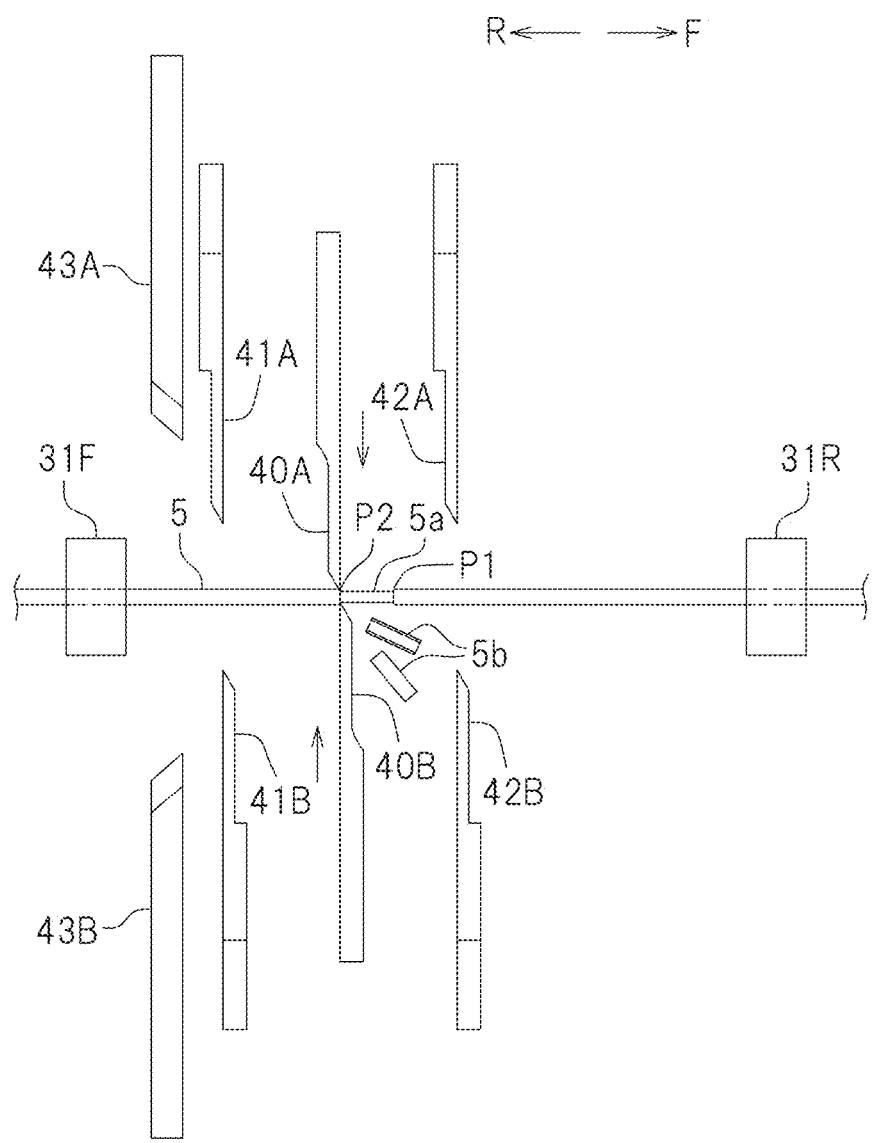
FIG. 14 is a right side view of the main portion of the cutter device when the second position of the covering is notched by the cutting blades.

The second position notching control section 95 of the controller 9 drives the main actuator 32 such that, while the slit blades 43A and 43B are held in the retraction position, the cutting blades 40A and 40B move toward the electrical wire 5. Specifically, the second position notching control section 95 causes the cutting blades 40A and 40B to come closer to each other such that each of the cutting blades 40A and 40B comes to a position just before a position in which the respective edges of the cutting blades 40A and 40B cross each other. Thus, as illustrated in FIG. 14, the covering 5b is circumferentially notched in the second position P2 by the cutting blades 40A and 40B. As a result, the covering 5b of the middle portion of the electrical wire 5 is circumferentially notched in the first position P1 and the second position P2 and the electrical wire 5 is slitted from the first position P1 to the second position P2 in the longitudinal direction CL of the electrical wire 5, and therefore, a portion of the covering 5b between the first position P1 and the second position P2 is stripped. That is, the covering 5b of the middle portion of the electrical wire 5 is stripped. The middle portion stripping process is as described above.

Note that there is no particular limitation on a timing of performing the above-described middle portion stripping process. The middle portion stripping process may be performed regardless of the end portion stripping process and the terminal crimping process. The middle portion stripping process may be performed after the cutting process and may be performed after the end portion stripping process. The middle portion stripping process may be performed after performing the cutting process, the end portion stripping process, and the terminal crimping process. Note that, in this case, the middle portion stripping process is performed on the rear electrical wire 5.

As described above, the electrical wire processing device 1 according to this embodiment includes the slit blade actuators 35A and 35B that move the slit blades 43A and 43B to the slit position and the retraction position. The cutting blades 40A and 40B and the slit blades 43A and 43B are disposed along the longitudinal direction CL of the electrical wire 5 but, by moving the slit blades 43A and 43B to the retraction position, the covering 5b of the middle portion of the electrical wire 5 can be circumferentially notched by the cutting blades 40A and 40B without being interfered by the slit blades 43A and 43B. On the other hand, by moving the slit blades 43A and 43B to the slit position, the covering 5b of the middle portion of the electrical wire 5 can be slitted in the longitudinal direction by the slit blades 43A and 43B without being interfered by the cutting blades 40A and 40B. Therefore, By the electrical wire processing device 1 according to this embodiment, while the cutting blades 40A and 40B and the slit blades 43A and 43B are disposed along the longitudinal direction CL of the electrical wire 5, the process of stripping the covering 5b of the middle portion of the electrical wire 5 (middle portion stripping process) can be performed. Accordingly, in the middle portion stripping process, it is sufficient to move the electrical wire 5 in the longitudinal direction CL (that is, the front-rear direction) and an operation of moving the electrical wire 5 in a direction (for example, a left-right direction) perpendicular to the longitudinal direction CL is not needed. An operation of moving the electrical wire 5 in the longitudinal direction CL can be performed quickly and efficiently, as compared to the operation of moving the electrical wire 5 in the direction perpendicular to the longitudinal direction CL. Therefore, By the electrical wire processing device 1 according to this embodiment, the middle portion stripping process can be performed quickly and efficiently.

By the electrical wire processing device 1 according to this embodiment, the cutting process and the end portion stripping process can be performed by the cutting blades 40A and 40B, the first stripping blades 41A and 41B, and the second stripping blades 42A and 42B disposed along the longitudinal direction CL of the electrical wire 5. In shifting from the cutting process to the end portion stripping process, the operation of moving the electrical wire 5 in the direction perpendicular to the longitudinal direction CL is not needed. In shifting from the cutting process or the end portion stripping process to the middle portion stripping process, and in sifting from the middle portion stripping process to the cutting process or the end portion stripping process, the operation of moving the electrical wire 5 in the direction perpendicular to the longitudinal direction CL is not needed. Therefore, by the electrical wire processing device 1 according to this embodiment, the cutting process, the end portion stripping process, and the middle portion stripping process can be performed quickly and efficiently.

The electrical wire processing device 1 according to this embodiment includes the first clamp member 31F disposed rearward of the first stripping blades 41A and 41B and the slit blades 43A and 43B, the second clamp member 31R disposed forward of the second stripping blades 42A and 42B and the slit blades 43A and 43B, the first clamp actuator 32F that moves the first clamp member 31F in the longitudinal direction CL of the electrical wire 5, and the second clamp actuator 32R that moves the second clamp member 31R in the longitudinal direction CL of the electrical wire 5. Therefore, the cutting process, the end portion stripping process for the end portions of both the electrical wires, and the middle portion stripping process can be favorably performed.

Note that different actuators may be provided for driving the cutting blades 40A and 40B, the first stripping blades 41A and 41B, and the second stripping blades 42A and 42B and for driving the slit blades 43A and 43B toward the electrical wire 5. However, according to this embodiment, a single main actuator 32 serves as those actuators. By the main actuator 32 that drives the cutting blades 40A and 40B, the slit blades 43A and 43B can be moved toward the electrical wire 5 to notch the covering 5*b*. According to this embodiment, the number of actuators can be reduced, so that a cost and a size of the electrical wire processing device 1 can be reduced.

In this embodiment, the slit blades 43A and 43B are disposed rearward of the first stripping blades 41A and 41B. That is, the slit blades 43A and 43B are disposed in a side opposite to a side in which the cutting blades 40A and 40B are provided with respect to the first stripping blades 41A and 41B. A margin in space is relatively large in the side of the first stripping blades 41A and 41B opposite to the side thereof in which the cutting blades 40A and 40B are provided. Therefore, according to this embodiment, the slit blades 43A and 43B can be easily set.

Note that there is no particular limitation on positions of the slit blades 43A and 43B. The slit blades 43A and 43B may be disposed forward of the second stripping blades 42A and 42B. That is, the slit blades 43A and 43B may be disposed in a side opposite to a side in which the cutting blades 40A and 40B are provided with respect to the second stripping blades 42A and 42B. Also in this case, setting of the slit blades 43A and 43B is facilitated.

On the other hand, in a case where there is a sufficient space between the cutting blades 40A and 40B and the first stripping blades 41A and 41B, the slit blades 43A and 43B may be disposed between the cutting blades 40A and 40B and the first stripping blades 41A and 41B. In a case where there is a sufficient space between the cutting blades 40A and 40B and the second stripping blades 42A and 42B, the slit blades 43A and 43B may be disposed between the cutting blades 40A and 40B and the second stripping blades 42A and 42B. Thus, a dimension of the cutter device 10 in the front-rear direction can be reduced, so that a size of the cutter device 10 can be reduced.

One embodiment of the present invention has been described above, but the above-described embodiment is merely an example. The present invention can be implemented in various other modes. Next, examples of other embodiments will be briefly described.

In the above-described embodiment, the cutting blades 40A and 40B, the first stripping blades 41A and 41B, the second stripping blades 42A and 42B, and the slit blades 43A and 43B are provided in pairs of upper and lower blades. However, the blades of each of the pairs of the cutting blades 40A and 40B, the first stripping blades 41A and 41B, the second stripping blades 42A and 42B, and the slit blades 43A and 43B may be disposed to face each other with the electrical wire 5 interposed therebetween and a disposition direction of each of the pairs is not limited to an up-down direction. For example, the cutting blades 40A and 40B, the first stripping blades 41A and 41B, the second stripping blades 42A and 42B, and the slit blades 43A and 43B may be provided in pairs of left and right blades.

In the above-described embodiment, the electrical wire processing device 1 includes the first stripping blades 41A and 41B disposed rearward of the cutting blades 40A and 40B and the second stripping blades 42A and 42B disposed forward of the cutting blades 40A and 40B such that the covering 5*b* of both end portions of the electrical wire 5 after being cut can be simultaneously stripped. However, the first stripping blades 41A and 41B disposed rearward of the cutting blades 40A and 40B or the second stripping blades 42A and 42B disposed forward of the cutting blades 40A and 40B may not be provided. That is, a pair of stripping blades may be provided only rearward or forward of the cutting blades 40A and 40B.

In the above-described embodiment, the cutter device 10 includes a pair of slit blades 43A and 43B. However, as long as the covering 5*b* of the middle portion of the electrical wire 5 can be stripped, one of the slit blades 43A and 43B may not be provided. That is, the number of slit blades of the cutter device 10 may be one.

In the above-described embodiment, the first stripping blades 41A and 41B and the second stripping blades 42A and 42B are indirectly joined to the cutting blades 40A and 40B such that the cutting blades 40A and 40B, the first stripping blades 41A and 41B, and the second stripping blades 42A and 42B can be driven by the same actuator 32. However, the first stripping blades 41A and 41B and the second stripping blades 42A and 42B may not be joined to the cutting blades 40A and 40B. Different actuators may be provided for driving the cutting blades 40A and 40B and for driving the first stripping blades 41A and 41B or the second stripping blades 42A and 42B.

In the above-described embodiment, the slit blades 43A and 43B are supported by the upper slit blade supporting member 34A fixed to the upper block 33A and the lower slit blade supporting member 34B fixed to the lower block 33B, respectively, such that the cutting blades 40A and 40B and the slit blades 43A and 43B can be driven by the same actuator 32. However, the upper slit blade supporting member and the lower slit blade supporting member movably supporting the slit blades 43A and 43B may not be fixed to the upper block 33A and the lower block 33B, respectively. Different actuators may be provided for driving the cutting blades 40A and 40B and for driving the slit blades 43A and 43B.

In the above-described embodiment, in the middle portion stripping process, after the first position P1 of the covering 5*b* is circumferentially notched, the covering 5*b* is slitted from the first position P1 to the second position P2 in the longitudinal direction CL, and then, the second position P2 is circumferentially notched. However, in the middle portion stripping process, circumferentially notchings of the first position P1 and the second position P2 and slitting of the covering 5*b* from the first position P1 to the second position P2 in the longitudinal direction CL may be eventually performed, and there is no particular limitation on an order of the notchings and the slitting. For example, after circumferentially notchings of the first position P1 and the second position P2 are performed, slitting of the covering 5*b* from the first position P1 to the second position P2 may be performed. As another option, after slitting of the covering 5*b* from the first position P1 to the second position P2 is performed, circumferentially notchings of the first position P1 and the second position P2 may be performed. In a case where the slit blades 43A and 43B are configured to slit the covering 5*b* both forward and rearward, a starting position of slitting of the covering 5*b* by the slit blades 43A and 43B may be an arbitrary position between the first position P1 and the second position P2. If the slit blades 43A and 43B are configured to be moved forward and rearward relative to the covering 5*b*, the starting position of slitting of the covering 5*b* by the slit blades 43A and 43B is not limited to the first position P1 or the second position P2. The slit blades 43A and 43B may be configured to eventually slit the covering 5*b* from the first position P1 to the second position P2.

In the above-described embodiment, the first clamp member 31F and the second clamp member 31R are configured to turn for the terminal cramping process, but there is no particular limitation thereon. The first clamp member 31F and the second clamp member 31R may be configured to move, for example, in a left-right direction.

In a case where the end portion stripping process is not needed, the first stripping blades 41A and 41B and the second stripping blades 42A and 42B of the cutter device 10 may not be provided.

The first clamp actuator 32F may be configured to relatively move the first clamp member 31F and the cutter device 10 along the longitudinal direction CL of the electrical wire 5, and is not limited to the clamp actuator that moves the first clamp member 31F. The first clamp actuator 32F may be configured to move the cutter device 10 in the longitudinal direction CL of the electrical wire 5. Similarly, the second clamp actuator 32R may be configured to relatively move the second clamp member 31R and the cutter device 10 along the longitudinal direction CL of the electrical wire 5, and is not limited to the clamp actuator that moves the second clamp member 31R. The second clamp actuator 32R may be configured to move the cutter device 10 in the longitudinal direction CL of the electrical wire 5.

In the above-described embodiment, in the middle portion stripping process, in sticking the slit blades 43A and 43B into the covering 5b of the electrical wire 5, the slit blades 43A and 43B are first moved to the slit position by driving the slit blade actuators 35A and 35B, and then, the slit blades 43A and 43B are moved to come closer to the electrical wire 5 by driving the main actuator 32. However, there is no particular limitation on an operation of sticking the slit blades 43A and 43B into the covering 5b of the electrical wire 5. For example, the slit blades 43A and 43B may be first moved to come closer to the electrical wire 5 by driving the main actuator 32, and then, the slit blades 43A and 43B may be stuck into the covering 5b of the electrical wire 5 by driving the slit blade actuators 35A and 35B.

The crimping machines 13F and 13R may not be needed. In a case where crimping of the terminal 7 is not needed, the crimping machines 13F and 13R may be omitted.

REFERENCE SIGNS LIST

1 Electrical wire processing device
5 Electrical wire
5b Covering
9 Controller
31F First clamp member
31R Second clamp member
32 Main actuator
32F First clamp actuator
32R Second clamp actuator
34A, 34B Slit blade supporting member
35A, 35B Slit blade actuator
40A, 40B Cutting blade
41A, 41B First stripping blade
42A, 42B Second stripping blade
43A, 43B Slit blade

What is claimed is:

1. An electrical wire processing device that processes an electrical wire having a core wire and a covering that covers a periphery of the core wire, the electrical wire processing device comprising:
    a pair of cutting blades capable of cutting the electrical wire and circumferentially notching the covering;
    a slit blade disposed farther in one side in a longitudinal direction of the electrical wire than the cutting blades and capable of slitting the covering in the longitudinal direction of the electrical wire; and
    a slit blade actuator that moves the slit blade between a slit position in which the slit blade comes closer to the electrical wire than the cutting blades and a retraction position in which the slit blade goes farther from the electrical wire than the cutting blades.

2. The electrical wire processing device according to claim 1, further comprising:
    a clamp member that is disposed farther in the one side in the longitudinal direction of the electrical wire than slit blade and holds the electrical wire; and
    a clamp actuator that relatively moves the clamp member and the slit blade along the longitudinal direction of the electrical wire.

3. The electrical wire processing device according to claim 2, further comprising:
    a main actuator that drives the pair of cutting blades such that the cutting blades come closer to each other and separate from each other; and
    a controller that controls the slit blade actuator, the clamp actuator, and the main actuator,
    wherein
    the controller includes
    a first position notching control section that circumferentially notches a first position in a middle portion of the covering of the electrical wire by driving the main actuator such that the cutting blades move toward the electrical wire while holding the slit blade in the retraction position,
    a first slit blade control section that notches the covering by driving the slit blade actuator to move the slit blade to the slit position and moving the slit blade toward the electrical wire,
    a second slit blade control section that relatively moves the slit blade with respect to the covering between the first position and a second position by driving the clamp actuator, and
    a second position notching control section that moves the slit blade to the retraction position by driving the slit blade actuator and circumferentially notches the second position of the covering by driving the main actuator such that the cutting blades move toward the electrical wire.

4. The electrical wire processing device according to claim 3, further comprising:
    a slit blade supporting member that supports the slit blade such that the slit blade is movable between the slit position and the retraction position and is joined to a corresponding one of the cutting blades to move with the cutting blade to come closer to and separate from the electrical wire,
    wherein
    the first slit blade control section is configured to move the slit blade toward the electrical wire to notch the covering by driving the main actuator.

5. The electrical wire processing device according to claim 1, further comprising:
    a pair of stripping blades disposed farther in one side or the other side in the longitudinal direction of the electrical wire than the cutting blades and capable of circumferentially notching the covering.

6. The electrical wire processing device according to claim 3, further comprising:
    a pair of stripping blades disposed farther in one side or the other side in the longitudinal direction of the electrical wire than the cutting blades and capable of circumferentially notching the covering, wherein each of the stripping blades is joined to a corresponding one of the cutting blades to move with the cutting blade to come closer to and separate from the electrical wire, the clamp actuator is configured to relatively move the clamp member and the stripping blades along the longitudinal direction of the electrical wire, the controller includes a cutting control section that cuts the electrical wire by driving the main actuator such that the cutting blades move toward the electrical wire while holding the slit blade in the retraction position, a stripping blade notching control section that circumferentially notches an end portion of the covering of the electrical wire by driving the main actuator such that the stripping blades move toward the end portion of the cut electrical wire while holding the slit blade in the retraction position, and a stripping control section that relatively moves the clamp member and the stripping blades in the longitudinal direction of the electrical wire by driving the clamp actuator in a state where the end portion of the covering of the electrical wire is being notched by the stripping blades while holding the slit blade in the retraction position.

7. The electrical wire processing device according to claim 5, wherein the slit blade is disposed farther in the one side in the longitudinal direction of the electrical wire than the stripping blades.

8. An electrical wire processing device that processes an electric wire having a core wire and a covering that covers a periphery of the core wire, the electrical wire processing device comprising:

a pair of cutting blades capable of cutting the electrical wire and circumferentially notching the covering;

a pair of first stripping blades disposed farther in one side in a longitudinal direction of the electrical wire than the cutting blades and capable of circumferentially notching the covering;

a pair of second stripping blades disposed farther in the other side in the longitudinal direction of the electrical wire than the cutting blades and capable of circumferentially notching the covering;

a slit blade disposed farther in the one side or the other side in the longitudinal direction of the electrical wire than the cutting blades and capable of slitting the covering in the longitudinal direction of the electrical wire; and a slit blade actuator that moves the slit blade between a slit position in which the slit blade comes closer to the electrical wire than the cutting blades, the first stripping blades, and the second stripping blades and a retraction position in which the slit blade goes farther from the electrical wire than the cutting blades, the first stripping blades, and the second stripping blades.

9. The electrical wire processing device according to claim 8, further comprising:

a first clamp member that is disposed farther in the one side in the longitudinal direction of the electrical wire than the first stripping blades and the slit blade and holds the electrical wire;

a second clamp member that is disposed farther in the other side in the longitudinal direction of the electrical wire than the second stripping blades and the slit blade and holds the electrical wire;

a first clamp actuator that relatively moves the first clamp member and the slit blade along the longitudinal direction of the electrical wire; and a second clamp actuator that relatively moves the second clamp member and the slit blade along the longitudinal direction of the electrical wire.

10. The electrical wire processing device according to claim 9, further comprising:

a main actuator that drives the pair of cutting blades such that the cutting blades come closer to each other and separate from each other; and a controller that controls the slit blade actuator, the first clamp actuator, the second clamp actuator, and the main actuator, wherein the controller includes a first position notching control section that circumferentially notches a first position in a middle portion of the covering of the electrical wire by driving the main actuator such that the cutting blades move toward the electrical wire while holding the slit blade in the retraction position, a first slit blade control section that notches the covering by driving the slit blade actuator to move the slit blade to the slit position and moving the slit blade toward the electrical wire, a second slit blade control section that relatively moves the slit blade with respect to the covering between the first position and a second position by driving the first clamp actuator or the second clamp actuator, and a second position notching control section that moves the slit blade to the retraction position by driving the slit blade actuator and circumferentially notches the second position of the covering by driving the main actuator such that the cutting blades move toward the electrical wire.

11. The electrical wire processing device according to claim 10, further comprising:

a slit blade supporting member that supports the slit blade such that the slit blade is movable between the slit position and the retraction position and is joined to a corresponding one of the cutting blades to move with the cutting blade to come closer to and separate from the electrical wire, wherein the first slit blade control section is configured to move the slit blade toward the electrical wire to notch the covering by driving the main actuator.

12. The electrical wire processing device according to claim 10, wherein each of the first stripping blades and each of the second stripping blades are joined to a corresponding one of the cutting blades to move with the cutting blade to come closer to and separate from the electrical wire, the first clamp actuator is configured to relatively move the first clamp member and the first stripping blades along the longitudinal direction of the electrical wire, the second clamp actuator is configured to relatively move the second clamp member and the second stripping blades along the longitudinal direction of the electrical wire, and the controller includes a cutting control section that cuts and divides the electrical wire into a first electrical wire in the one side in the longitudinal direction of the electrical wire and a second electrical wire in the other side in the longitudinal direction of the electrical wire by driving the main actuator such that the cutting blades move toward the electrical wire while holding the slit blade in the retraction position, a stripping blade notching control section that circumferentially notches end portions of the coverings of the first electrical wire and the second electrical wire by driving the main actuator such that the first stripping blades move toward the end portion of the divided first electrical wire and the second stripping blades move toward the end portion of the divided second electrical wire while holding the slit blade in the retraction position, and a stripping control section that relatively moves the first clamp member and the first stripping blades in the longitudinal direction of the first electrical wire and relatively moves the second clamp member the second stripping blades in the longitudinal direction of the second electrical wire by driving the first clamp actuator and the second clamp actuator in a state where the end portion of the covering of the first electrical wire is being notched by the first stripping blades and the end portion of the covering of the second electrical wire is being notched by the second stripping blades while holding the slit blade in the retraction position.

13. The electrical wire processing device according to claim 8, wherein the slit blade is disposed farther in the one side in the longitudinal direction of the electrical wire than the first stripping blades or is disposed farther in the other side in the longitudinal direction of the electrical wire than the second stripping blades.

\* \* \* \* \*